United States Patent
Kirchweger et al.

(10) Patent No.: US 8,468,987 B2
(45) Date of Patent: Jun. 25, 2013

(54) INTERNAL COMBUSTION ENGINE HAVING EIGHT CYLINDERS IN A V-CONFIGURATION

(75) Inventors: Wolfram Kirchweger, Munich (DE); Ralf Kadura, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/462,447

(22) Filed: May 2, 2012

(65) Prior Publication Data

US 2012/0210960 A1   Aug. 23, 2012

Related U.S. Application Data

(63) Continuation of application No. PCT/EP2010/006122, filed on Oct. 7, 2010.

(30) Foreign Application Priority Data

Nov. 13, 2009   (DE) .......................... 10 2009 053 269

(51) Int. Cl.
*F01L 1/34*   (2006.01)
(52) U.S. Cl.
USPC ..................................... 123/90.15; 123/90.16
(58) Field of Classification Search
USPC .................. 123/90.15, 90.47, 90.1, 90.16
See application file for complete search history.

(56) References Cited

U.S. PATENT DOCUMENTS

| | | | |
|---|---|---|---|
| 6,397,802 B1 | 6/2002 | Rutschmann et al. | |
| 7,275,511 B1 | 10/2007 | Wright et al. | |
| 7,424,874 B2 * | 9/2008 | Takamiya et al. | 123/90.16 |
| 2002/0033151 A1 | 3/2002 | Bayer | |
| 2007/0074686 A1 | 4/2007 | Takamiya et al. | |

FOREIGN PATENT DOCUMENTS

| | | |
|---|---|---|
| DE | 199 54 689 A1 | 5/2001 |
| DE | 100 46 221 A1 | 10/2002 |
| DE | 10 2005 032 791 A1 | 1/2007 |
| JP | 2003-56374 A | 2/2003 |
| WO | WO 2007/016713 A2 | 2/2007 |

OTHER PUBLICATIONS

German Search Report dated Jun. 23, 2010 with partial English translation (nine (9) pages).
International Search Report dated Dec. 16, 2010 with English translation (six (6) pages).

* cited by examiner

*Primary Examiner* — Zelalem Eshete
(74) *Attorney, Agent, or Firm* — Crowell & Moring LLP

(57) ABSTRACT

An internal combustion engine having eight cylinders in V-configuration, wherein a first cylinder bank and a second cylinder bank are disposed opposite one another. The internal combustion engine includes a cross-plane crankshaft and has a firing order of a 90° crank angle from cylinder to cylinder. An intake camshaft and an exhaust camshaft are associated with each cylinder bank for actuating at least one intake gas exchange valve and one exhaust gas exchange valve for each cylinder. The gas exchange intake valves that are actuated at a 90° crank angle in the same cylinder bank have a larger valve stroke than the gas exchange intake valves in same cylinder bank actuated immediately prior thereto. The gas exchange intake valves in the same cylinder bank actuated immediately prior thereto have a smaller valve stroke than all the remaining gas exchange intake valves of both cylinder banks.

12 Claims, 1 Drawing Sheet firing sequence : 1 — 5 — 4 — 8 — 6 — 3 — 7 — 2

INTERNAL COMBUSTION ENGINE HAVING EIGHT CYLINDERS IN A V-CONFIGURATION

CROSS-REFERENCE TO RELATED APPLICATIONS

This application is a continuation of PCT International Application No. PCT/EP2010/006122, filed Oct. 7, 2010, which claims priority under 35 U.S.C. §119 from German Patent Application No. DE 10 2009 053 269.2, filed Nov. 13, 2009, the entire disclosures of which are herein expressly incorporated by reference.

BACKGROUND AND SUMMARY OF THE INVENTION

The invention relates to an internal combustion engine having eight cylinders in a V-configuration wherein a first, a second, a third and a fourth cylinder, arranged side-by-side in series, form a first cylinder bank; and a fifth, a sixth, a seventh and an eighth cylinder, arranged side-by-side in series, form a second cylinder bank, which lies opposite the first cylinder bank.

German Published Patent Application DE 199 54 689 A1 discloses a generic internal combustion engine having eight cylinders in a V-configuration. A first, a second, a third and a fourth cylinder arranged side-by-side in series form a first cylinder bank; and a fifth, a sixth, a seventh and an eighth cylinder also arranged side-by-side in series form a second cylinder bank opposite the first cylinder bank. Furthermore, the internal combustion engine has a crankshaft with a 90° bend, that is, a cross-plane crankshaft, and an ignition interval of 90° crank angle (90° CA) from cylinder to cylinder. For the charge cycle each cylinder bank has an intake camshaft and an exhaust camshaft in order to actuate the intake gas exchange valves and the exhaust gas exchange valves for each cylinder. In order to improve, inter alia, the smooth running of the internal combustion engine, in particular in neutral and under smaller partial loads, it is proposed to provide means for implementing differing exhaust valve lift progressions of at least two cylinders arranged in one cylinder row in order to reduce the overlapping opening phases of these exhaust gas exchange valves. In this context the intake valve and the exhaust valve of one of the two cylinders are themselves in an overlapping opening phase.

Even if this prior art internal combustion engine with eight cylinders in V-configuration does not have, in principle, any drawbacks, the object of the present invention is to provide an additional measure to reduce the rough running of the internal combustion engine, in particular, in neutral and in the lower partial load range.

This and other objects are achieved by an internal combustion engine with eight cylinders in V-configuration, wherein a first, a second, a third and a fourth cylinder, arranged side-by-side in series, form a first cylinder bank; and a fifth, a sixth, a seventh and an eighth cylinder, arranged side-by-side in series, form a second cylinder bank, which lies opposite the first cylinder bank. The internal combustion engine has a cross-plane crankshaft and an ignition interval of 90° crank angle from cylinder to cylinder. Each cylinder bank has an intake camshaft and an exhaust camshaft in order to actuate at least one intake gas exchange valve and one exhaust gas exchange valve for each cylinder. The intake gas exchange valves of the cylinders, which form each cylinder bank and are actuated according to a 90° crank angle in the same cylinder bank, have a larger valve lift than the intake gas exchange valves in the same cylinder bank actuated immediately prior thereto. The intake gas exchange valves in the same cylinder bant actuated immediately prior thereto have a smaller valve lift than all of the remaining intake gas exchange valves of both cylinder banks.

This further development according to the invention makes it possible to attain in an advantageous way an equalization of the specific work of the individual cylinders in each cylinder bank and, thus, to reduce the rotational irregularity in the critical operating ranges, in particular in neutral and in the lower partial load range. Owing to this inventive measure the use of applied measures can be avoided, a state that leads to an improvement in the efficiency (less fuel consumption and/or $CO_2$ emission), the smooth running and raw pollution emission. In addition, the improved smooth running makes it possible to lower the idling speed and, as a result, leads to a reduction in the idling fuel consumption.

In a first preferred exemplary embodiment, the intake gas exchange valves are actuated via one intermediate element each. The larger valve lift occurs by way of a lift correction of the intermediate element. The intermediate element may be, for example, a drag or rocking lever.

In a second preferred exemplary embodiment, the intermediate element is supported at the cylinder head on a play compensating element. The larger valve lift occurs by way of a height and/or angular position correction of the play compensating element. The play compensating element may be, for example, a hydraulic play compensating element.

In a third preferred exemplary embodiment, the intake gas exchange valves are actuated by way of a variable lift valve timing mechanism with a lift adjustment element. The larger valve lift occurs by way of a lift correction of the lift adjustment element.

Particularly preferably, the larger and/or the smaller lift height ranges from 0.005 mm to 1.0 mm with respect to the remaining intake gas exchange valves. This preferred range of values particularly achieves the inventive effect.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
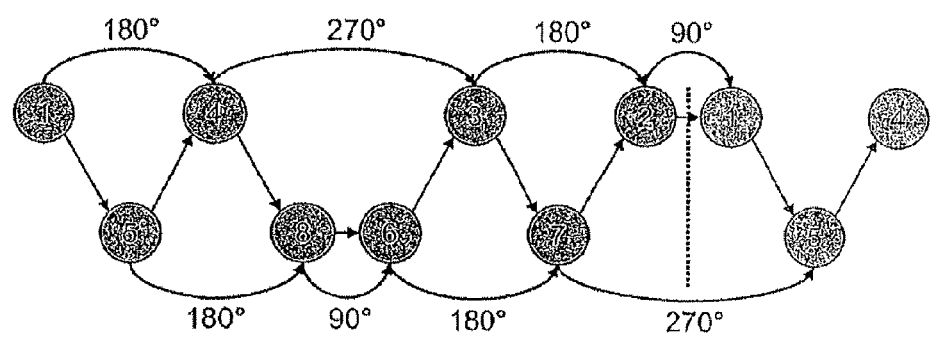
FIG. 1 shows in schematic form a firing sequence for a generic internal combustion engine with eight cylinders in a V-configuration.

In both figures, like reference numerals apply to identical components.

Figure 2:
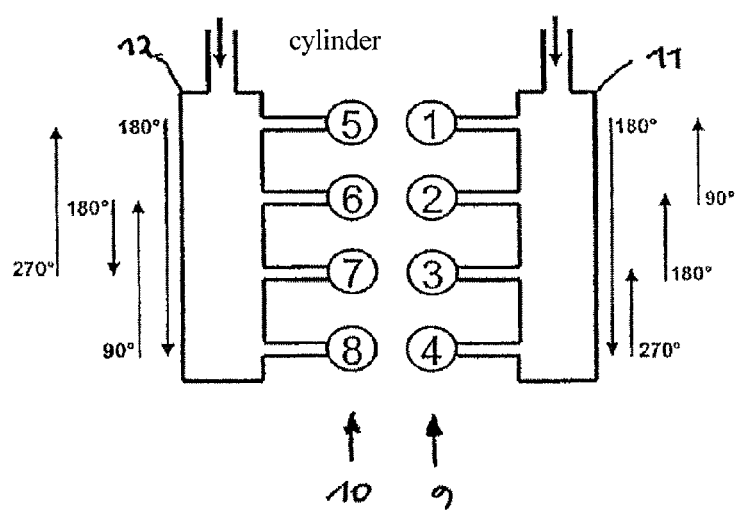
FIG. 2 shows in schematic form a generic internal combustion engine with eight cylinders in V-configuration.

FIG. 1 shows in schematic form a firing sequence for a generic internal combustion engine with eight cylinders in V-configuration. The cylinders are shown in symbolic form as spheres and are numbered in sequence from 1 to 8 according to the cylinder number. The first, the second, the third and the fourth cylinder 1, 2, 3, 4 are arranged side-by-side in a first cylinder row, as shown in FIG. 2, and form a first cylinder bank 9. The fifth, the sixth, the seventh and the eighth cylinder are arranged side-by-side in a second cylinder row and form a second cylinder bank 10, which lies opposite the first cylinder bank 9. In addition, the internal combustion engine has a cross-plane crankshaft, which results in an ignition interval of 90° crank angle from cylinder to cylinder. Furthermore, each cylinder bank 9, 10 has an intake camshaft (not illustrated) and an exhaust camshaft (also not illustrated) in order to actuate at least one intake gas exchange valve and at least one exhaust gas exchange valve for each cylinder.

The firing sequence for the internal combustion engine conforming to its genre runs: cylinder 1-cylinder 5-cylinder 4-cylinder 8-cylinder 6-cylinder 3-cylinder 7-cylinder 2, and then repeats from the beginning. The schematic diagram shows this firing sequence with internal straight arrows from cylinder to cylinder. In addition, the ignition interval in degree of crank angle (deg. CA) of the cylinders of each cylinder bank 9, 10 are shown by external, curved arrows. Due to the irregular firing sequence with respect to a cylinder bank 9, 10, the ignition intervals from cylinder to cylinder amount to 90° or 180° or 270° crank angle. A re-start of the firing sequence is shown by a vertical dotted line.

Working on the above basis, the result of the illustrated, irregular firing sequence in V8 internal combustion engines with a cross-plane crankshaft is a mutual interference effect among the cylinders 1, 2, 3, 4, 5, 6, 7, 8 owing to the gas dynamics in both an air accumulator and in an exhaust gas manifold. The maximum mutual interference effect takes place inside a cylinder bank 9, 10 between the cylinders 1, 2, 6, 8 with 90° ignition interval each and generates for reasons of the gas dynamics a differing fresh gas filling, charge cycle work and residual gas content and, thus, a differing cylinder specific work. Especially in neutral and in the partial load range, the results are rotational irregularities, which in the past were minimized as much as possible by applied measures.

Typical are the following measures:

1. Cylinder selective ignition timing: All of the cylinders 1, 2, 3, 4, 5, 6, 7, 8 of a bank 9, 10 are moved to the level of the worst cylinder by retarding the ignition timing. As a result, the overall efficiency deteriorates in a disadvantageous way.

2. Cylinder selective mixture pilot control: The cylinders are put on a uniform level by a targeted enriching or leaning ($\lambda, \neq 1$) of the cylinders. The drawback with this strategy is that the overall efficiency of the internal combustion engine decreases, the smooth running of the leaned cylinders deteriorates, and the raw pollutant emission increases.

3. Selective throttling: In order to reduce the rotational irregularities, the lift in the case of a variable intake valve lift can be enlarged; and the load can be reduced again by way of the throttle flap. The disadvantageous results are a degradation of the efficiency of the internal combustion engine and, thus, a worsening of the fuel consumption.

In order to eliminate the aforementioned drawbacks, according to the invention the intake gas exchange valves of those cylinders (1, 2, 3, 4, 5, 6, 7, 8) that form a cylinder bank (9, 10) and that are actuated according to a 90° crank angle in the same cylinder bank (9, 10) have a larger valve lift than the just previously actuated intake gas exchange valves in the same cylinder bank (9, 10); and the just previously actuated intake gas exchange valves in the same cylinder bank (9, 10) have a smaller valve lift than all of the remaining intake gas exchange valves of both cylinder banks (9, 10). This means that a targeted adaptation of the individual intake valve lifts corrects the differing work of the individual cylinders 1, 2, 3, 4, 5, 6, 7, 8. As a result, in critical operating points the above described, system dependent rotational irregularities are totally eliminated from the V8 typical charge cycle in the ideal case. That means that the intake gas exchange valves of the cylinders 1, 2, 3, 4, 5, 6, 7, 8 with less specific work are opened to a greater degree; the intake gas exchange valves of the cylinders 1, 2, 3, 4, 5, 6, 7, 8 with higher specific work are opened to a lesser degree. For the technical implementation three different embodiments are proposed:

1. that the intake gas exchange valves be actuated by way of one intermediate element each and that the larger valve lift occurs by way of a lift correction of the intermediate element, which can be preferably a drag or rocking lever.

2. that the intermediate element be supported at the cylinder head on a play compensating element and that the larger valve lift occurs by way of a height and/or angular position correction of the play compensating element; wherein the play compensating element is even more preferably a hydraulic play compensating element.

3. that the intake gas exchange valves be actuated by a variable lift valve timing mechanism with a lift adjustment element and that the larger valve lift occur by way of a lift correction of the lift adjustment element. Such a variable lift valve timing mechanism is known, for example, from DE 101 23 186 A1 and may be found in all BMW engines having the so-called Valvetronic technology. In this case the lift of the gas exchange valves of the individual cylinders 1, 2, 3, 4, 5, 6, 7, 8 can be corrected, for example, by a variety of control cams for each position of an eccentric shaft that conforms to its genre, so that there is the possibility of an optimization for a multiplicity of operating points.

FIG. 2 shows in schematic form a generic internal combustion engine with eight cylinders in V-configuration. The individual cylinders 1, 2, 3, 4, 5, 6, 7, 8 are once again shown in symbolic form as spheres. The cylinders 1, 2, 3, 4 lie side-by-side in a row and form the first cylinder bank 9. The cylinders 5, 6, 7, and 8 also lie side-by-side in a row and form the second cylinder bank 10, so that the second cylinder bank 10 lies opposite the first cylinder bank 9. The first cylinder bank 9 has a first air accumulator 11; and the second cylinder bank 10 has a second air accumulator 12. The flow direction of the incoming air is shown in schematic form by arrows. In addition to the air accumulators 11, 12, the ignition interval of the individual cylinders of the respective bank 9, 10 is shown once again in schematic form by arrows.

The further development according to the invention makes it possible to attain an equalization of the specific work of the individual cylinders 1, 2, 3, 4, 5, 6, 7, 8 and, thus, a reduction in the rotational irregularity in critical operating ranges, in particular, in neutral and in the partial load range.

This feature results in an advantageous way in the following:

(a) avoidance of the use of applied measures and, thus, an improvement in the efficiency of the internal combustion engine (fuel consumption and/or $CO_2$ emission), the smooth running, and raw pollution emissions; and (b) lowering of the idling speed for reasons of improved smooth running, a feature that leads to a reduction in the idling fuel consumption.

LIST OF REFERENCE NUMERALS 1. first cylinder
2. second cylinder
3. third cylinder
4. fourth cylinder
5. fifth cylinder
6. sixth cylinder
7. seventh cylinder
8. eighth cylinder
9. first cylinder bank
10. second cylinder bank
11. first air accumulator
12. second air accumulator The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine, comprising:
   eight cylinders in a V-configuration, wherein a first, a second, a third and a fourth cylinder arranged side-by-side in series form a first cylinder bank, and wherein a fifth, a sixth, a seventh and an eighth cylinder arranged side-by-side in series form a second cylinder bank lying opposite the first cylinder bank;
   a cross-plane crankshaft, the internal combustion engine having an ignition interval of 90° crank angle from cylinder to cylinder;
   each cylinder bank having an intake camshaft and an exhaust camshaft in order to actuate at least one intake gas exchange valve and one exhaust gas exchange valve for each cylinder;
   wherein the intake gas exchange valves of the cylinders forming each cylinder bank actuated according to a 90° crank angle in the same cylinder bank have a larger valve lift than the intake gas exchange valves in the same cylinder bank actuated immediately prior thereto; and
   wherein the intake gas exchange valves in the same cylinder bank actuated immediately prior thereto have a smaller valve lift than all of the remaining intake gas exchange valves of both cylinder banks.

2. The internal combustion engine according to claim 1, further comprising intermediate elements, each intermediate element respectively actuating one of the intake gas exchange valves; and
   wherein the larger valve lift occurs by way of a lift correction of the respective intermediate element.

3. The internal combustion engine according to claim 2, wherein the respective intermediate element is one of a drag and rocking lever.

4. The internal combustion engine according to claim 2, wherein the intermediate element is supported at a cylinder head on a play compensating element, and further wherein the larger valve lift occurs by way of at least one of a height and angular position correction of the play compensating element.

5. The internal combustion engine according to claim 3, wherein the intermediate element is supported at a cylinder head on a play compensating element, and further wherein the larger valve lift occurs by way of at least one of a height and angular position correction of the play compensating element.

6. The internal combustion engine according to claim 4, wherein the play compensating element is a hydraulic play compensating element.

7. The internal combustion engine according to claim 5, wherein the play compensating element is a hydraulic play compensating element.

8. The internal combustion engine according to claim 1, further comprising a variable lift valve timing mechanism by which the intake gas exchange valves are actuated, the variable lift valve timing mechanism having a lift adjustment element; and
   wherein the larger valve lift occurs by way of a lift correction of the lift adjustment element.

9. The internal combustion engine according to claim 1, wherein at least one of the larger and the smaller lift height ranges from 0.005 mm to 1.0 mm with respect to the remaining intake gas exchange valves.

10. The internal combustion engine according to claim 2, wherein at least one of the larger and the smaller lift height ranges from 0.005 mm to 1.0 mm with respect to the remaining intake gas exchange valves.

11. The internal combustion engine according to claim 4, wherein at least one of the larger and the smaller lift height ranges from 0.005 mm to 1.0 mm with respect to the remaining intake gas exchange valves.

12. The internal combustion engine according to claim 8, wherein at least one of the larger and the smaller lift height ranges from 0.005 mm to 1.0 mm with respect to the remaining intake gas exchange valves.

* * * * *